(12) United States Patent
Summers

(10) Patent No.: US 9,091,052 B1
(45) Date of Patent: Jul. 28, 2015

(54) IRRIGATION SYSTEM HAVING TRUSS ROD CONNECTOR ASSEMBLY

(71) Applicant: Valmont Industries, Inc., Omaha, NE (US)

(72) Inventor: James D. Summers, West Point, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 14/056,013

(22) Filed: Oct. 17, 2013

Related U.S. Application Data

(60) Provisional application No. 61/714,795, filed on Oct. 17, 2012.

(51) Int. Cl.
| | |
|---|---|
| *E04C 3/02* | (2006.01) |
| *E04B 1/19* | (2006.01) |
| *A01G 25/09* | (2006.01) |
| *F16B 7/04* | (2006.01) |

(52) U.S. Cl.
CPC .............. *E04B 1/1906* (2013.01); *A01G 25/09* (2013.01); *A01G 25/092* (2013.01); *E04B 1/1903* (2013.01); *E04B 1/1909* (2013.01); *F16B 7/0486* (2013.01)

(58) Field of Classification Search
CPC ... E04B 1/1903; E04B 1/1909; E04B 1/1906; Y10T 403/443; A01G 25/092; A01G 25/09; F16B 7/0486
USPC ..................................... 52/655.1, 655.2, 696
See application file for complete search history.

(56) References Cited

U.S. PATENT DOCUMENTS

| | | | | | |
|---|---|---|---|---|---|
| 143,348 | A | * | 9/1873 | Holmes ......................... | 285/325 |
| 1,150,781 | A | * | 8/1915 | Louden ......................... | 403/218 |
| 1,261,213 | A | * | 4/1918 | Clay ............................. | 403/233 |
| 2,658,776 | A | * | 11/1953 | Wilcox ......................... | 52/653.2 |
| RE25,623 | E | * | 7/1964 | Bristle ........................... | 119/652 |
| 3,566,911 | A | * | 3/1971 | Neier ............................ | 239/732 |
| 3,720,374 | A | * | 3/1973 | Ross ............................. | 239/731 |
| 3,834,549 | A | * | 9/1974 | Burg et al. .................... | 211/189 |
| 4,090,528 | A | * | 5/1978 | Hegemann ................... | 239/728 |
| 4,161,331 | A | * | 7/1979 | Hansen ......................... | 285/5 |
| 4,982,546 | A | * | 1/1991 | Lange ........................... | 52/655.1 |
| 5,127,759 | A | * | 7/1992 | Orbom ......................... | 403/171 |
| 5,499,883 | A | * | 3/1996 | Heinzel ........................ | 403/219 |
| 5,667,326 | A | * | 9/1997 | McGaffigan ................. | 403/176 |
| 6,032,430 | A | * | 3/2000 | Soukup ........................ | 52/656.9 |
| 6,056,240 | A | * | 5/2000 | Hagenlocher ................ | 244/125 |
| 6,273,633 | B1 | * | 8/2001 | Husson et al. ............... | 403/218 |
| 6,378,265 | B1 | * | 4/2002 | Konstandt .................... | 52/655.2 |
| 8,528,291 | B2 | * | 9/2013 | Allred et al. ................. | 52/655.1 |
| 2008/0313992 | A1 | * | 12/2008 | Schornack .................... | 52/696 |

\* cited by examiner

*Primary Examiner* — Basil Katcheves
*Assistant Examiner* — Joshua Ihezie
(74) *Attorney, Agent, or Firm* — David H. Milligan PC LLO

(57) ABSTRACT

The present disclosure is directed to a connector assembly configured to receive a truss rod head of a truss rod in an irrigation system. In an implementation, the connector assembly includes a connector body configured to couple to at least one diagonal of the irrigation system. The connector body is also configured to continually maintain greater than one contact area with the truss rod head. In a specific implementation, the connector body defines a socket for securely receiving the truss rod head such that the socket maintains at least two points of contact area with the truss rod head at all times.

2 Claims, 9 Drawing Sheets

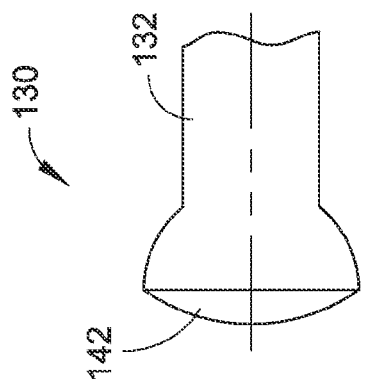
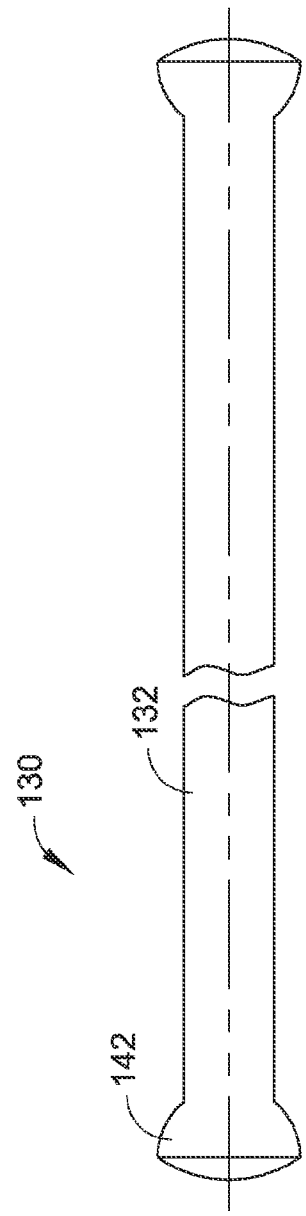
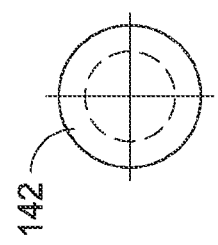

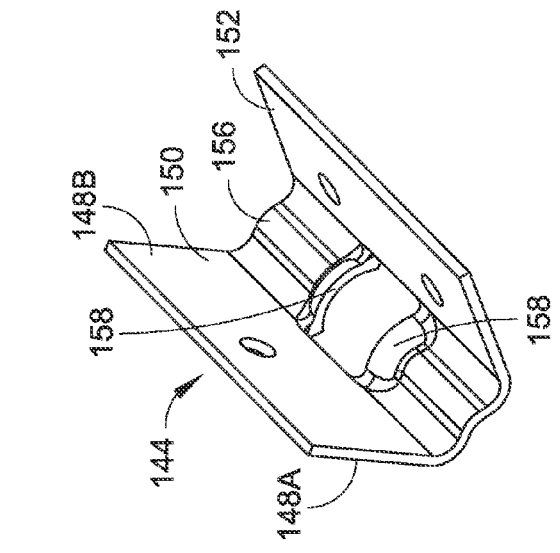
FIG. 3C
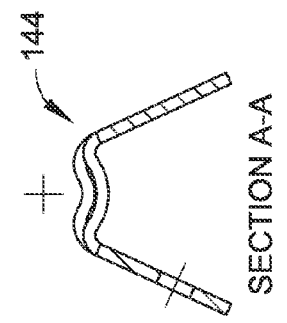
FIG. 3F
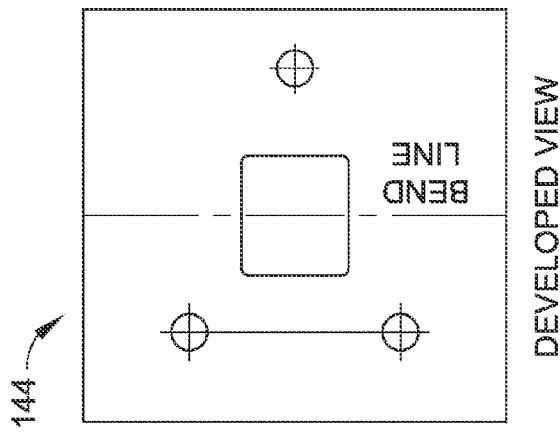
FIG. 3B
FIG. 3E
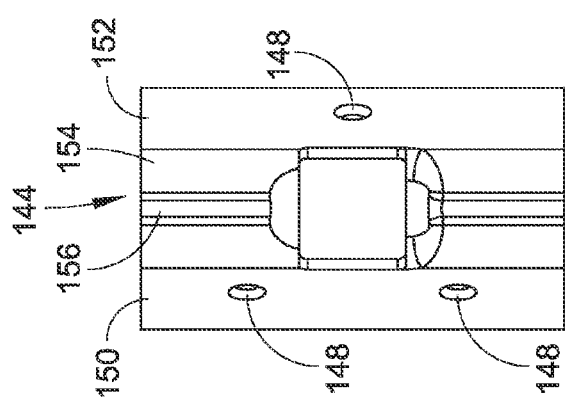
FIG. 3A
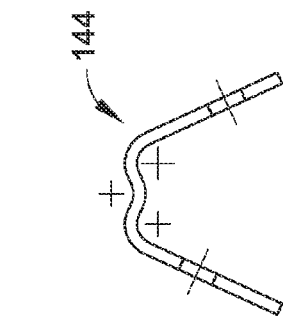
FIG. 3D

FORMED VIEWS

SECTION A-A

IRRIGATION SYSTEM HAVING TRUSS ROD CONNECTOR ASSEMBLY

CLAIM OF PRIORITY

This application claims the benefit of priority under 35 U.S.C. §119(e) of James Summers, U.S. Provisional Patent Application Ser. No. 61/714,795, entitled "IRRIGATION SYSTEM HAVING TRUSS ROD CONNECTOR ASSEMBLY," filed on Oct. 17, 2012, which prior application is incorporated by reference herein in its entirety.

BACKGROUND

Modern day agriculture has become increasingly efficient in the past century and this trend must continue in order to produce a sufficient food supply for the increasing world population. A notable advancement in agricultural production was the introduction of mechanized irrigation systems, such as center pivot and the linear move irrigation systems. These irrigation systems make it possible to irrigate entire fields, and reduce a crop yield's vulnerability to extreme weather conditions. The ability to monitor and to control the amount of water and/or nutrients (applicants) applied to an agricultural field has increased the amount of farmable acres in the world and increases the likelihood of a profitable crop yield. These irrigation systems typically include a control device configured to furnish a user interface allowing the operator to monitor and control one or more functions or operations of the irrigation system.

SUMMARY

A connector assembly is disclosed that is configured to receive a truss rod head of a truss rod in an irrigation system such that the connector assembly continually maintains at least one contact area with the truss rod head. In an implementation, the connector assembly includes a connector body configured to couple to at least one diagonal of the irrigation system. The connector body is also configured to continually maintain greater than one contact area with the truss rod head. In a specific implementation, the connector body defines a socket for securely receiving the truss rod head such that the socket maintains at least two points of contact area with the truss rod head at all times.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The Detailed Description is described with reference to the accompanying figures. The use of the same reference numbers in different instances in the description and the figures may indicate similar or identical items.

FIGS. 2A through 2C are diagrammatic partial views illustrating example truss rods and truss rod heads in accordance with an example implementation of the present disclosure.

FIGS. 3A through 3F are various diagrammatic views of an inner connector portion of the connector assembly in accordance with an example implementation of the present disclosure.

DETAILED DESCRIPTION

Figure 1:
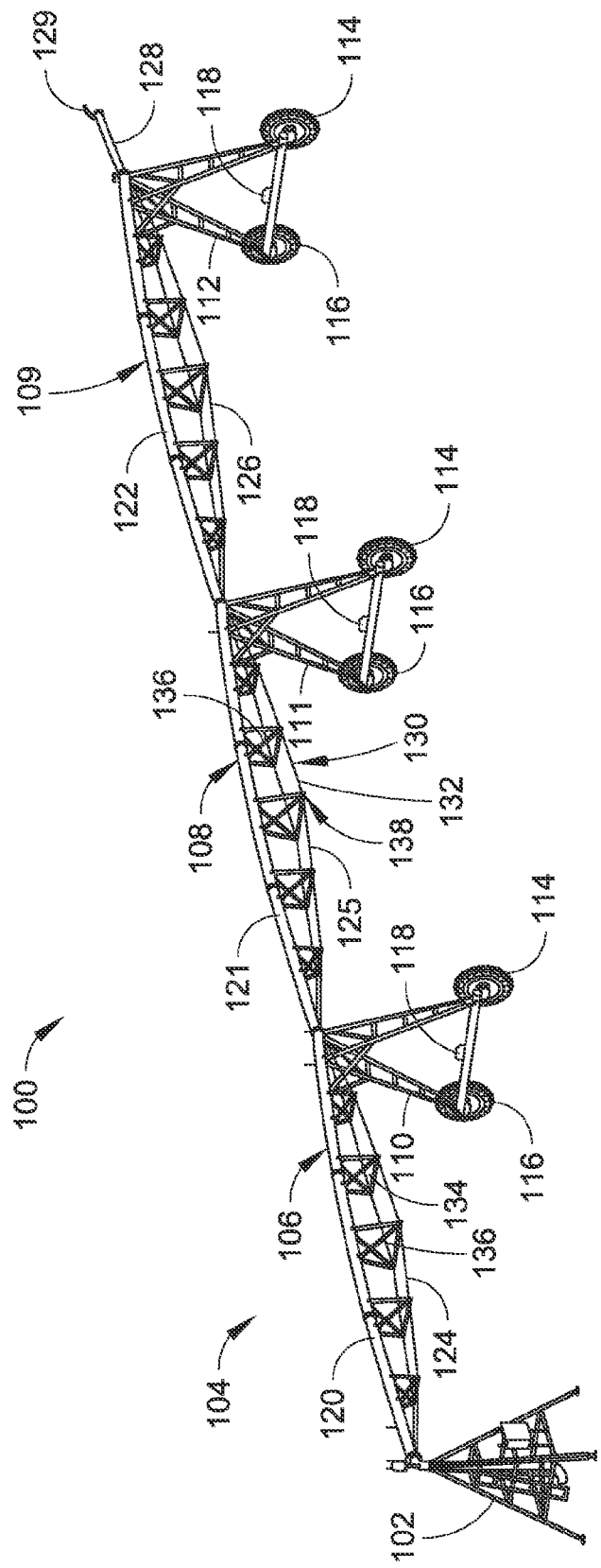
FIG. 1 is a perspective view illustrating an irrigation system having a connector assembly in accordance with an example implementation of the present disclosure.
Figure 4A:
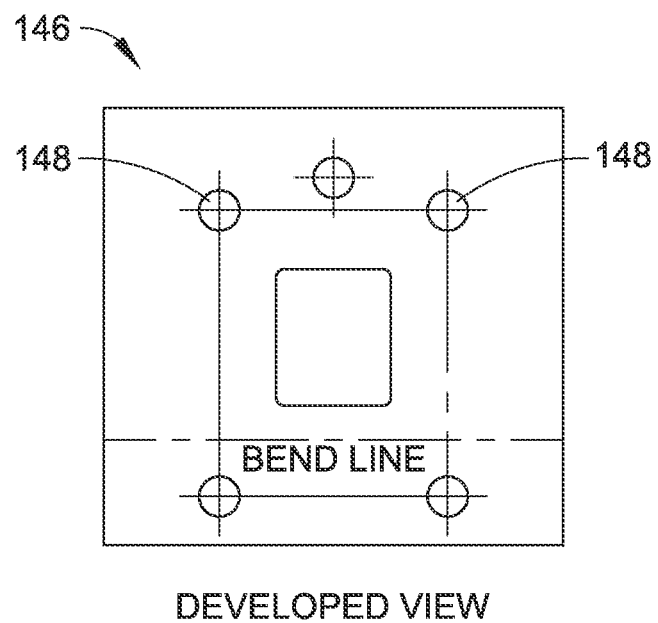
FIGS. 4A through 4D are various diagrammatic views of an outer connector portion of the connector assembly in accordance with an example implementation of the present disclosure.
Figure 4B:
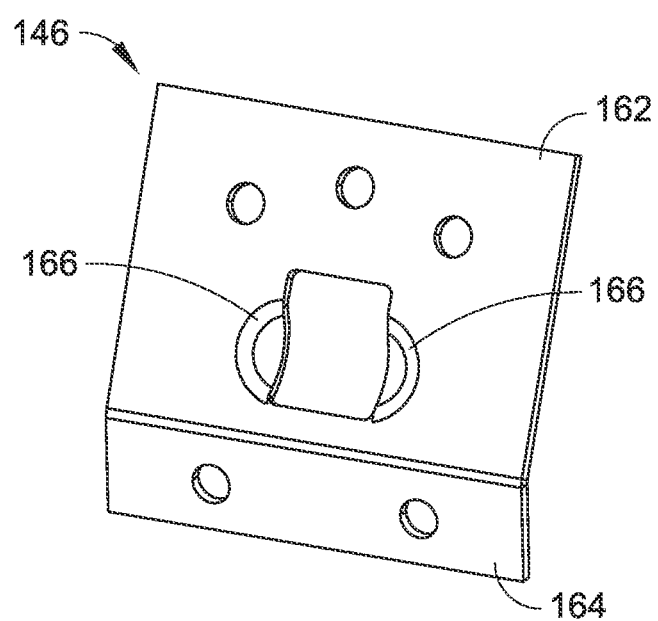
Figure 4C:
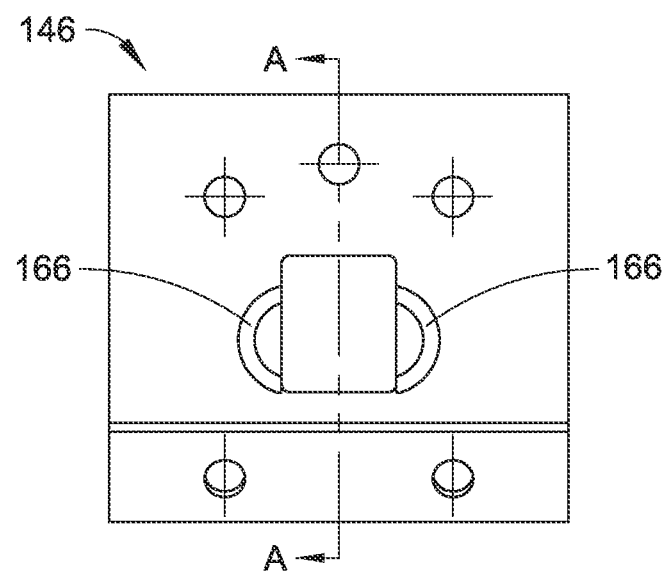
Figure 4D:
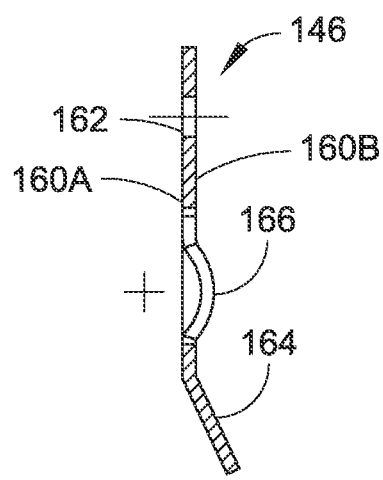

When a gap occurs between truss rod heads and the connectors that receive the truss rod head due to angular misalignment (e.g., due to the bow shape of the truss), the misalignment may result in a single point of contact between the truss rod head and the connector. The single point of contact may create a high force point, which can result in steel fatigue and connector erosion. Continued fatigue and erosion may eventually result in failure of the truss rod head FIG. 1 illustrates a self-propelled irrigation system (assembly) 100 in accordance with example implementations of the present disclosure. Examples of self-propelled irrigation systems include a center pivot irrigation system, a linear move irrigation system, or the like. FIG. 1 illustrates an implementation of the present disclosure where the irrigation system 100 is a center pivot irrigation system. However, it is contemplated that the present disclosure may be implemented in other self-propelled irrigation systems (e.g., linear move irrigation systems). As shown, the system 100 includes a center pivot structure 102 and a main section assembly 104 (irrigation section assembly) coupled (e.g., connected) to the center pivot structure 102. The center pivot structure 102 has access to a well, a water repository (e.g., water tank), or other fluid source, to furnish water to the irrigation system 100. For instance, the well may be located under the center pivot structure 102. In another instance, the well may be in close proximity to the cultivation area (e.g., field). The fluid source may be coupled to a repository or other source of agricultural products to inject fertilizers, pesticides, and/or other chemicals into the fluids to create an applicant for application during irrigation. Thus, the applicant may be water, fertilizer, herbicide, pesticide, combinations thereof, or the like. The irrigation system 100 may be coupled to a fluid displacement device (e.g., a pump assembly) configured to furnish applicant throughout the irrigation system 100. For example, the fluid displacement device may assist in displacing fluid from the fluid source (e.g., well, water repository, etc.) to the conduit portions of the irrigation system which are described herein. The center pivot structure 102 can be fixed or can be towable such that an operator can move the irrigation system 100 from one field to another. In an implementation, the center pivot structure 102 may comprise a frame assembly (e.g., galvanized steel frame assembly, and so forth).

The main section assembly 104 includes a number of interconnected spans 106, 108, 109 (e.g., irrigation spans) supported by one or more tower structures 110, 111 (intermediate tower structures) and an end tower structure 112. The tower structures 110, 111, 112 may be any tower configuration known in the art to adequately support the conduits (e.g., water pipe sections) described herein. It is understood that the section assembly 104 may include any number of spans and tower structures.

The tower structures 110, 111 and the end tower structure 112 each include wheels 114, 116, to assist in traversing the irrigation system 100 (e.g., allowing the main section assembly 104 to pivot) about a cultivation area (e.g., field). In an implementation, the wheels 114, 116 may be driven by a suitable drive unit 118 (e.g., drive motor), or the like, to assist in traversing the system 100 about the specified area. For example, each tower structure 110 may include a drive unit 118 to propel the respective tower structure 110, 111, 112 (and the irrigation system 100) through the cultivation area. It is understood that while only two wheels 114, 116 are shown coupled to each tower structure 110, 111, 112, each tower structure 110, 111, 112 may include additional wheels according to the design requirements of the irrigation system 100.

As shown in FIG. 1, each span 106, 108 includes conduits 120, 121, 122 (e.g., pipes) that are configured to carry (e.g., transport, provide, and so forth) liquid (e.g., applicant) along the length of the system 100 to one or more applicant dispersal assemblies that are configured to irrigate the cultivation area. Each conduit 120, 121, 122 may be coupled to one another to allow fluid communication between each conduit. In an implementation, the conduits 120, 121, 122 may be supported by truss-type framework structures 124, 125, 126. Thus, the main fluid displacement device may be configured to displace applicant through the conduits 120, 121, 122. As shown in FIG. 1, the irrigation system 100 also includes a cantilevered boom structure 128 that extends outwardly from the end tower structure 112. In one or more implementations, the cantilevered boom 128 includes an end gun 129 (e.g., end gun 129 is mounted to the cantilevered boom 128). The end gun 129 may be a suitable pressure sprayer configured to be activated at the corners of a field, or other designated areas, to increase the amount of land that can be irrigated.

As shown in FIG. 1, multiple truss rods 130 are tensioned between the tower structures 110, 111, 112. In implementations, the truss rods 130 include truss rod segments 132 (i.e., shaft components) extending longitudinally between the truss-type framework structures 124, 125, 126. The truss rod segments 132 may be arranged end-to-end and separated using spreaders 134 suspended from the respective span 106, 108, 109. For example, the spreaders 134 may be suspended from the respective span 106, 108, 109 using, for example, diagonals 136. As shown in FIGS. 1 and 3A through 5C, and described in greater detail below, the truss rods 130 are connected together using truss rod coupling assemblies, such as connector assemblies 138, which may be used to couple the spreaders 134 and the diagonals 136 together. In one or more implementations, the connector assemblies 138, the spreaders 134, and the diagonals 136 are coupled together utilizing fastening components, such as screws, bolts, or the like.

FIGS. 2A through 5C illustrate example implementations of truss rods 130 and connector assemblies 138 in accordance with the present disclosure. As shown in FIGS. 2A through 2C, each truss rod 130 includes a segment 132 (the shaft component) and an enlarged truss rod head 142 (e.g., head 142 is has a larger diameter with respect to the diameter of the segment 132) disposed at each end of the segment 132. In a specific implementation, the truss rod head 142 is a semi-spherical truss rod head. However, it is understood that the truss rod heads 142 may comprise other shapes in accordance according to the design requirements of the irrigation system 100.

As shown in FIGS. 3A through 5C, in a specific implementation, the connector assemblies 138 may comprise an inner connector portion 144 and two outer connector portions 146 that serve to mate (e.g., clamp) together about a pair of truss rod heads 142 and portions of the pair of truss rod segments 132. In an implementation, the inner connector portion 144 and the outer connector portions 148 comprise a connector body. The connector portions 144, 146 each define a plurality of apertures 148 that are configured to receive fastening components, such as screws, bolts, or the like, to allow for the coupling of the connector portions 144, 146 together to form the connector assembly 138, as well as coupling the respective connector assembly 138 to the corresponding diagonals 136 and spreaders 134. Once clamped, or mated, together, the inner connector portion 144 and the outer connector portion 146 are configured to securely retain the truss rod heads 142 in position with respect to each other (e.g., the other truss rod head 142 that is positioned within the connector assembly 138).

As shown in FIGS. 3A through 3F, the inner connector portion 144 includes an inner face portion 148A and an outer face portion 148B. The inner connector portion 144 also includes side portions 150, 152 with a middle portion 154 disposed therebetween. The middle portion 154 defines a partially arcuate portion 156 that bows outwardly with respect to outer face portion 148B. The partially arcuate portion 156 serves to allow the inner connector portion 144 to receive the respective truss rod segment 132 of the truss rod 130 when the inner connector portion 144 is mated with the outer connector portion 146. The middle portion 154 also defines an at least partially spherical arcuate portion 158 that bows outward with respect to the outer face portion 148B. The at least partially spherical arcuate portion 158 serves to allow the inner portion 144 to securely receive a portion of the respective truss rod head 142 when the inner connector portion 144 is mated with the outer connector portions 146. The at least partially spherical arcuate portion 158 is configured to maintain contact, at all times (regardless of angular misalignment between truss rods 130), with the respective truss rod head 142.

As shown in FIGS. 4A through 4D, each outer connector portion 146 includes an inner face portion 160A and an outer face portion 160B. Each outer connector portion 146 also includes a body portion 162 that is configured to couple with the corresponding side portion 150, 152 (and the body portion 162 of the other outer connector portion 146 couples to the other of the side portions 150, 152 when the inner connector portion 144 and the outer connector portions 146 are mated together), as well as an angled portion 164 that is configured to the corresponding angled portion 164 of the other outer connector portion 146. As shown, each body portion 162 defines an at least partially spherical arcuate portion 166 that bows outward with respect to the outer face portion 160B. The at least partially spherical arcuate portion 166 is configured to securely receive a portion of the respective truss rod head 142 when the outer connector portions 146 are mated together with inner connector portion 144 to form the connector assembly 138. The at least partially spherical arcuate portions 166 are also configured to maintain contact, at all times (regardless of angular misalignment between truss rods 130), with the respective truss rod head 142. In an implementation, the at least partially spherical arcuate portion 158 of the inner connector portion 144 and the at least partially spherical arcuate portions 166 form a socket that securely receives the respective truss rod head 142.

Figure 5A:
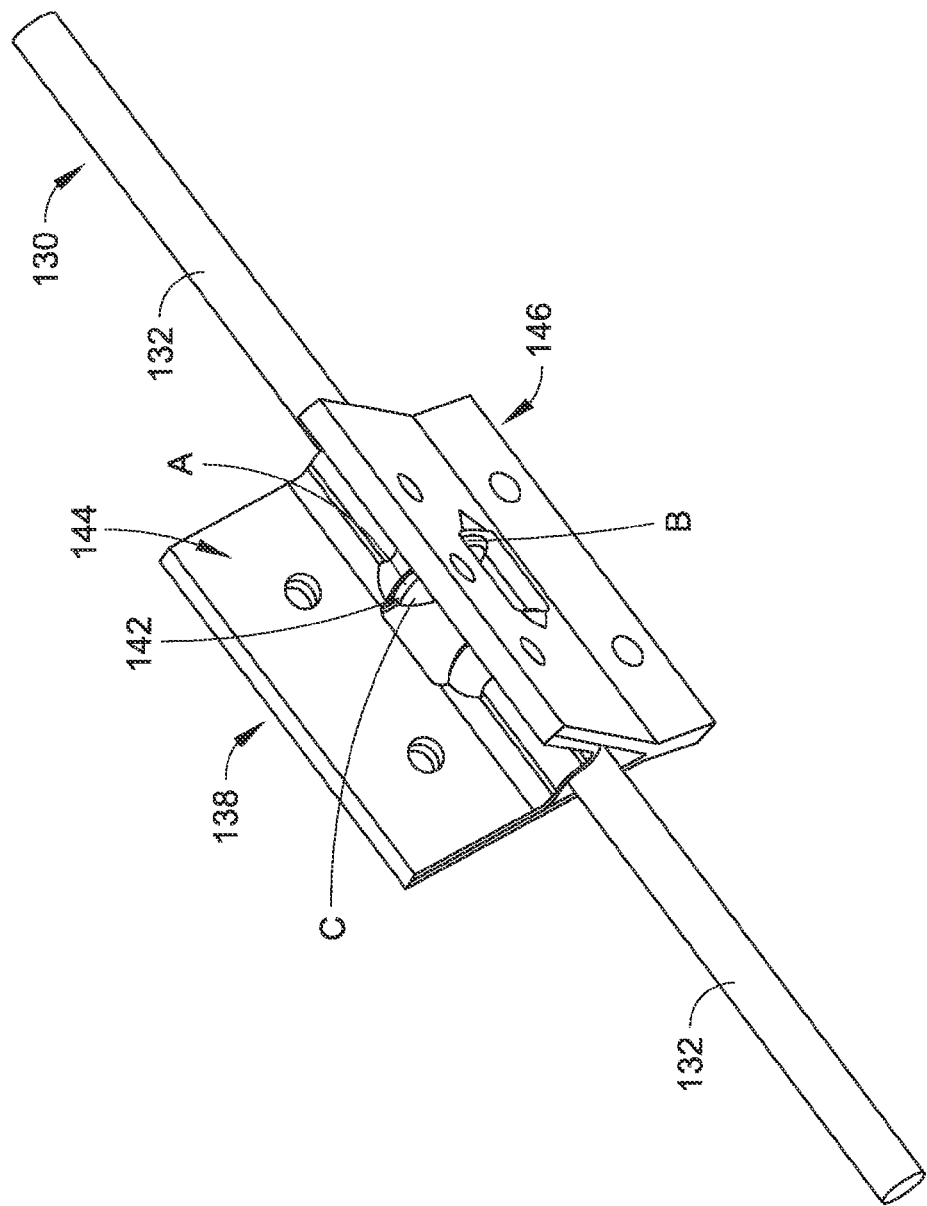
FIGS. 5A through 5C are various partial diagrammatic perspective views illustrating a connector assembly that has received truss rods and corresponding truss rod heads in accordance with an example implementation of the present disclosure, where the connector assembly is configured to maintain greater than one contact point, or contact area, with each received truss rod head at all times.
Figure 5B:
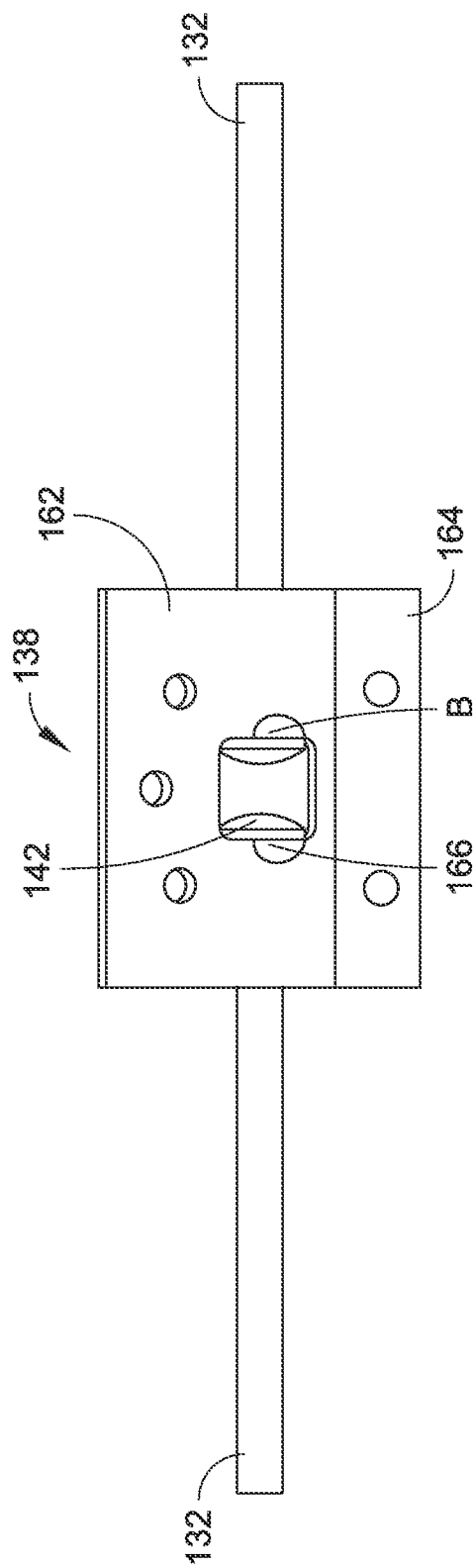
Figure 5C:
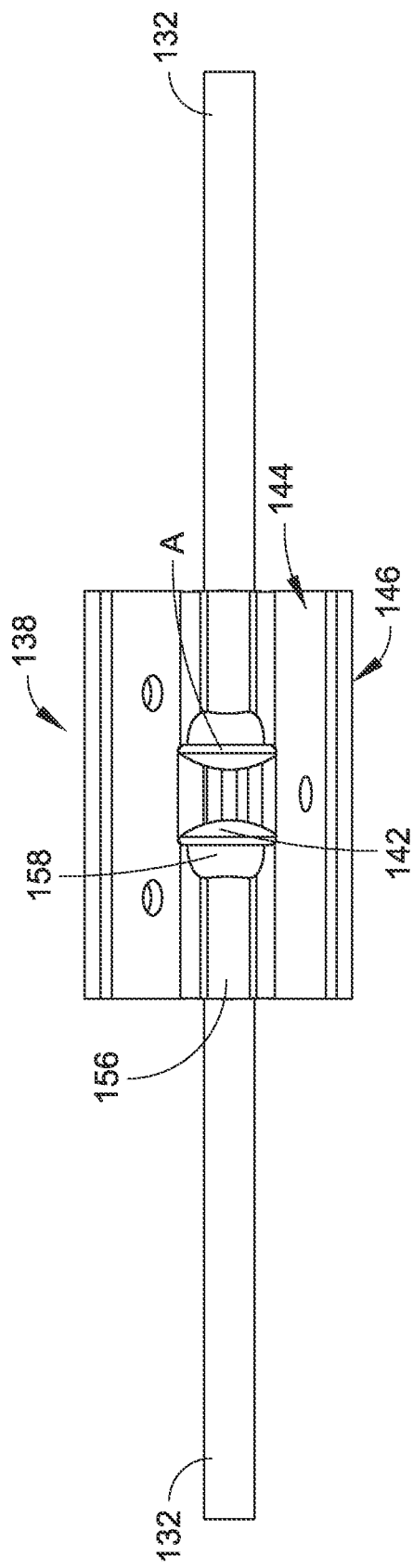

Thus, as shown in FIGS. 5A through 5C, when the inner connector portions 144 and the two outer connector portions 146 are mated together to form the connector assembly 138 about the respective truss rods 130, the connector assembly 138 is configured to maintain greater than one contact area with the truss rod head 142 at all times, even during times of angular misalignment between the spans 106, 108, 109. In a specific implementation, the connector assembly 138 maintains three (3) points of contact (e.g., contact areas) with the truss rod heads 142 at all times. FIG. 5A illustrates generally the three (3) points of contact areas (e.g., points A, B, and C) that the connector assembly 138 maintains with the truss rod heads 142, which may reduce failure at the truss rod heads due to steel fatigue and connector erosion caused by angular misalignment between the spans of the irrigation system.

Figure 6:
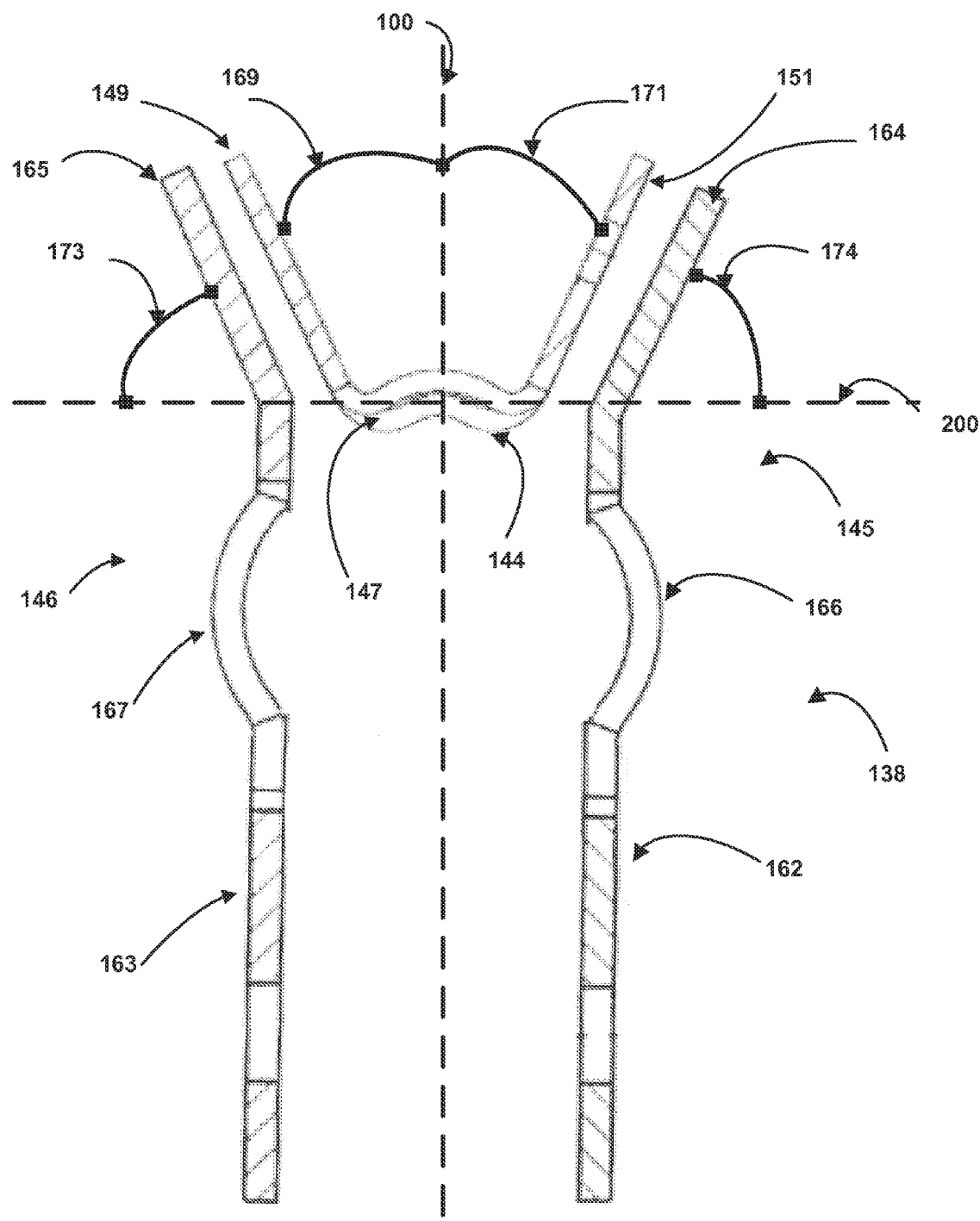
FIG. 6 is a cross-sectional view of the connector assembly shown in FIG. 5A.

With reference now to FIG. 6, a cross-sectional view of the connector assembly 138 is shown. As discussed above, the connector assembly 138 as shown includes an inner connector portion 144 and a pair of outer connector portions 145 and 146. As further discussed above with reference to FIG. 4D, outer connector portion 145 includes a base portion 162, a spherical arcuate portion 166 and an angled portion 164. Likewise, outer connector portion 146 includes a base portion 163, a spherical arcuate portion 167 and an angled portion 165. As further shown, the inner connector portion 144 preferably includes a central portion 147, a first wing portion 149 and a second wing portion 151.

As shown in FIG. 6, according to a preferred embodiment, the individual elements of the connector assembly 138 are preferably arranged so that, once mated together, the inner connector portion 144 and the outer connector portions 145 and 146 are positioned to securely retain the truss rod heads (not shown). For convenience, the arrangement of the elements of the connector assembly 138 in FIG. 6 is illustrated with respect to a first plane 100 which horizontally bisects the inner connector portion 144 and a second plane 200 which is perpendicular to the first plane 100 and which is substantially parallel to the front face of the central portion 147 of the inner connector portion 144.

As shown, according to a preferred embodiment, the elements of the connector assembly 138 are preferably arranged with respect to the first plane 100 and the second plane 200 so that: a first angle 169 is created between the first wing portion 149 and the first plane 100; a second angle 171 is created between the second wing portion 151 and the first plane 100; a third angle 173 is created between angled portion 165 and the second plane 200; a fourth angle 174 is created between angled portion 164 and the second plane 200. According to a further preferred embodiment, the elements of the connector assembly 138 are preferably joined so that the sum of the first angle 169 and the third angle 173 is approximately 90 degrees; and the sum of the third angle 171 and the fourth angle 174 is approximately 90 degrees.

While the above description describes arcuate portions and at least partially spherical arcuate portions, it is understood that the present disclosure may utilize a number of shaped portions that correspond to the shape of the truss rod and the truss rod head. Thus, any number of shapes may be utilized in order for the connector assembly to maintain greater than one point of contact with the truss rod head at all times.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A connector body assembly configured to secure a plurality of truss rods, wherein the connector body comprises:
    an inner connector portion, wherein the inner connector portion is comprised of:
        a central portion, wherein the central portion further comprises a partially spherically arcuate area;
        a first wing portion, wherein the first wing portion is articulated outward from the central portion to form a first offset angle between the first wing portion and a first plane which vertically bisects the inner connector portion;
        a second wing portion, wherein the second wing portion is articulated outward from the central portion to form a second offset angle between the second wing portion and the first plane;
    a first outer connector portion, wherein said first outer connector portion is comprised of:
        a first base portion, wherein the first base portion is substantially parallel to the first plane;
        a spherical arcuate portion; and
        an first angled portion, wherein the first angled portion is articulated outward from the first base portion to form a third offset angle between the first angled portion and a second plane which extends through the central portion of the inner connector portion and which is perpendicular to the first plane;
    a second outer connector portion, wherein said second outer connector portion is comprised of:
        a second base portion, wherein the second base portion is substantially parallel to the first plane;
        a spherical arcuate portion; and
        an second angled portion, wherein the second angled portion is articulated outward from the second base portion to form a fourth offset angle between the second angled portion and the second plane;
    wherein, the sum of the first angle and the third angle is substantially 90 degrees; and further wherein, the sum of the second angle and the fourth angle is substantially 90 degrees.

2. The connector assembly as recited in claim 1, wherein the connector body defines a socket for securely receiving the truss rod head, the socket configured to maintain at least two points of contact area with the truss rod head at all times.

* * * * *